Sept. 22, 1942.    W. NEUMANN    2,296,566
FILTER
Filed Aug. 2, 1939    2 Sheets-Sheet 1
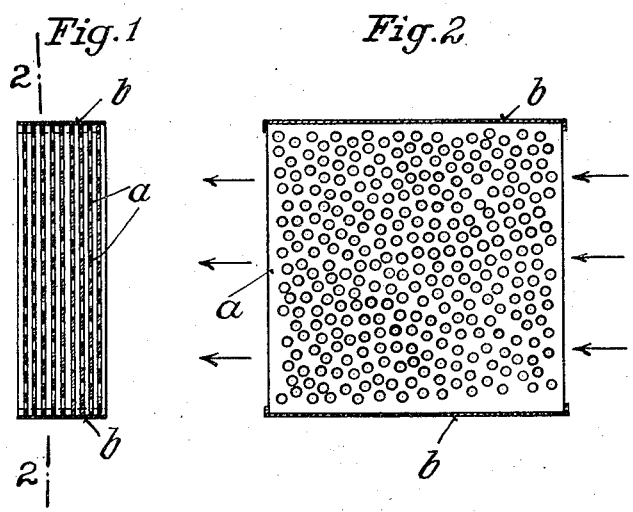
Inventor:
WILLY NEUMANN
BY Richey & Watts
ATTORNEYS Sept. 22, 1942.   W. NEUMANN   2,296,566
FILTER
Filed Aug. 2, 1939   2 Sheets-Sheet 2
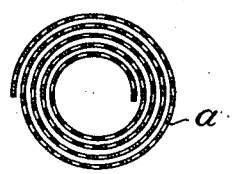
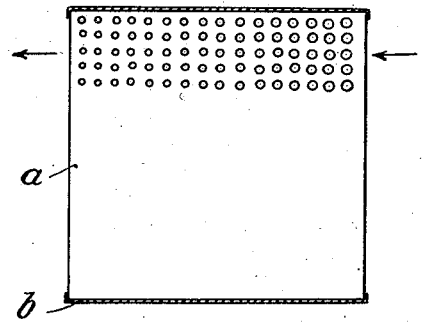
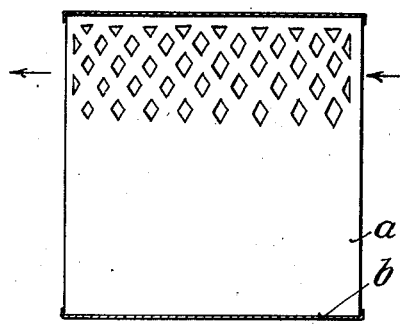
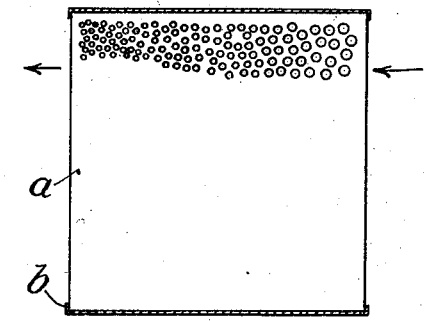
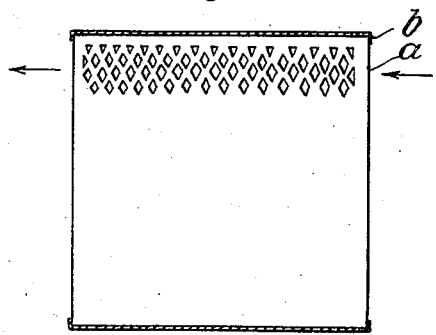
Inventor:
WILLY NEUMANN
Richey & Watts
ATTORNEYS.

Patented Sept. 22, 1942

2,296,566

UNITED STATES PATENT OFFICE 2,296,566

FILTER

Willy Neumann, Ladeburg, near Bernau, Germany; vested in the Alien Property Custodian Application August 2, 1939, Serial No. 287,970
In Germany August 10, 1938

4 Claims. (Cl. 183—110)

The present invention relates to a fine filter comprising plates wetted with viscous material whereby air or gas is freed from even the finest solid or liquid impurities entrained thereby.

By the invention there is solved the problem of providing with simple means a filter having a high filtering capacity and a large storage capacity for separated impurities, and offering little resistance to flow of the air or gas to be filtered.

Furthermore, the invention provides a construction of filter which is relatively light in weight and which can be readily cleaned without requiring to be taken apart.

The invention is based on the observation that the filtering power of open-work or foraminous or apertured plates is increased to an unexpected extent when these plates, which are packed together in the usual manner, are not traversed perpendicularly to the plane thereof by the gas or air to be freed from impurities but the gas is caused to flow over the surface of said plates; that is, when the filter is arranged with the plates disposed edgewise to the direction of flow of the air or gas. With this arrangement the result is also obtained that with the same depth of package the resistance to flow is considerably less than when the air or gas stream impinges perpendicularly on the plates. In this connection it may be remarked that the area of the aperture in the foraminous or open-work plate is of subordinate importance as regards the filtering capacity, for even if the apertures are larger by a hundred fold or more than the particles to be retained, the extent of separation of the finest particles is not reduced. It is recommended, however, that the apertures should be bounded by sharp edges rather than by rounded edges.

It is known to construct a filter from a pack of solid plates in which the medium to be purified flows through ribbon-like interstices between plates provided with projections. In the present filter, there are no such symmetrical interspaces confined by fixed boundaries and extending ribbon-wise between adjoining plates. The medium to be filtered is distributed vertically and breadthwise, each fine jet or sheet seeking the path of least resistance through the filter. The air or gas jets are repeatedly intermingled whereby there are effected alterations in direction of flow and repeated sub-division of the stream under flow. The path of flow is not confined to a straight-through passage between adjoining plates but there is offered to the medium under flow a largely increased surface in consequence of the provision of apertures in the sieve-like or open-work plates, while on account of the depth of the pack of plates there is provided a large effective storage space for impurities removed from the medium to be filtered.

Even although it was previously known that filters may be readily penetrable by light and yet have a high filtering capacity, nevertheless it was not to be expected that it would be found that in filters according to the invention which are highly penetrable by light there should be required so small a quantity of filter mass per unit area distributed over the filter structure.

The invention thus contemplates the use of sieve-like members used as filters and disposed edgewise to the air or gas stream.

The invention is illustrated by way of example in the accompanying drawings in which similar parts are designated by similar reference characters.

Fig. 1 is a section through a filter composed of apertured plates.

Fig. 2 is a section on the line 2—2 of Fig. 1 showing the direction of flow as indicated by arrows.

Fig. 3 is a sectional view showing a rolled up filter band.

Figs. 4 through 7 are side elevational views of filter plates having a plurality of openings formed therein, which openings are reduced in size and increased in number in the direction of flow.

In Figs. 1, 2, and 4 to 7, inclusive, the filter comprises spaced apertured plates $a$ wetted with a viscous material such as oil or the like. The filter frame is designated $b$. The arrows indicate the direction of flow of the air to be purified in its passage through the filter.

In the practical application of the invention there is realised the further advantage that, as is known, generally, in the stabbing of perforations, such as shown in Figs. 2, 4, and 6, and in the production of open-mesh sieves and the like, as shown in Figs. 5 and 7, there remain projections, deflections and ragged edges or the like at boundaries of the apertures or perforations, depending on the nature of the method of production. Such projections, deflections or the like constitute spacing members for the pack of plates, it having been found that such projections are of a size suitable to constitute spacing members for the purpose of fine purification.

Filters according to the invention may be simply made of perforated or open-mesh structure in strips or bands $a$ of a width of several centimeters, and these bands may be coiled into rolls which are disposed edgewise to the stream of the medium to be filtered, as shown in Fig. 3. The length of the band is chosen to ensure the desired surface of contact; the band width is chosen to suit the desired depth of the filter. When constructed in this way each convolution of the coil constitutes a lamination or filtering element corresponding in function to one of the parallel plates arranged as shown in Fig. 1.

Fine filters according to the invention are, as a rule, produced from metals selected in accordance with the conditions. The metal surfaces are coated with viscous substance such as oil or the like. It is frequently advantageous to combine sieves or open-work plates to form a pack with perforations of varying area in each plate or varying from plate to plate. For example, as shown in Figs. 4 to 7 inclusive, there may be employed perforated or other open-work plates the size of the apertures of which diminishes in a direction towards the outlet from the filter. The medium then flows first past the larger apertures; the more deeply the medium penetrates the filter, the smaller are the apertures encountered.

Finally, it is possible to replace some plates of the pack by filter cloths, so that within the pack the air also flows over the surface of filter cloths. These cloths may be of the same area as the plates; they may, however, be much narrower, so that they bear on the plates only in the vicinity of the outlet zone for the air which is already to a large extent purified by passing over the remainder of the filter.

In all cases there is realised a fine filter with high powers of purification which is impacted by the stream in a different manner from that followed in other constructions.

From the point of view of structure it will be recognised that the improved filter has considerably greater rigidity of form than known sieve filters, as the planes of the plates are disposed in the direction of flow.

There are also realised the following important advantages:

(a) As the pressure of the air or gas under flow on the sieve or open-work metal walls falls away, these elements may be made thinner and weaker, or with uniform cross-section may be of larger area, because the mechanical stresses do not need to be taken into account. That is, within the same space a large number of sieves or expanded metal sheets may be fitted; this means a correspondingly larger effective surface.

(b) With the arrangement according to the invention there are obtained as many small air eddies as there are present meshes or apertures in the respective filter elements. These eddies are particularly effective if the apertures are bounded by sharp edges.

(c) As will be immediately understood, the small eddies which are formed are oppositely directed, whereby the separation of very fine dust is promoted. This phenomenon is especially pronounced if the filter is traversed by air or gas at a higher speed than usual.

The aforesaid advantages are realised in a very simple manner with quite inexpensive means.

What is claimed is:

1. A gas filter embodying a plurality of spaced laminations extending longitudinally in straight lines parallel to each other and to the direction of flow of the stream of gas to be filtered, each of said laminations being formed from an apertured plate having a viscous coating, said laminations being spaced apart to define straight unrestricted paths for the gas to be filtered and the apertures in said plates producing eddies to effect impingement of particles carried in the gas against the plates.

2. A filter embodying a plurality of plates spaced apart to define straight unrestricted paths therebetween, said plates being parallel to each other and to the direction of flow of the stream of gas to be filtered and said plates having apertures formed therein the number of which increases in the direction of flow of the stream of gas, said apertures producing eddies to effect impingement of particles carried by the gas against the plates.

3. A gas filter embodying a roll of apertured sheet metal, the convolutions of said roll forming spaced filter laminations and having a viscous coating, said roll being arranged with its axis parallel to the direction of flow of the stream of gas to be filtered with the laminations defining straight unrestricted paths therebetween, the apertures in said sheet metal producing eddies to effect impingement of particles carried by the gas against the surfaces of the convolutions of the roll.

4. A filter embodying a plurality of plates spaced apart to define straight unrestricted paths therebetween, said plates being parallel to each other and to the direction of flow of the stream of gas to be filtered and said plates having apertures formed therein the edges of which are sharp, said apertures producing eddies to effect impingement of particles carried by the gas against the plates.

WILLY NEUMANN.